United States Patent [19]

Ishigami

[11] Patent Number: 4,834,047
[45] Date of Patent: May 30, 1989

[54] SPARK-IGNITION INTERNAL COMBUSTION ENGINE

[75] Inventor: Kazuhiro Ishigami, Yokohama, Japan

[73] Assignee: Nissan Motor Co., Ltd., Yokohama, Japan

[21] Appl. No.: 54,905

[22] Filed: May 27, 1987

[30] Foreign Application Priority Data

May 30, 1986 [JP] Japan ................................. 61-125449

[51] Int. Cl.$^4$ .............................................. F02P 5/15
[52] U.S. Cl. ..................................... 123/416; 123/432
[58] Field of Search ............... 123/308, 432, 409, 416, 123/417

[56] References Cited

U.S. PATENT DOCUMENTS

| | | | |
|---|---|---|---|
| 4,237,828 | 12/1980 | Sugiyama | 123/308 |
| 4,532,902 | 8/1985 | Mizuno | 123/308 |
| 4,592,315 | 6/1986 | Kobayashi | 123/308 |

FOREIGN PATENT DOCUMENTS 10778 1/1984 Japan ................................. 123/308

*Primary Examiner*—Tony M. Argenbright
*Attorney, Agent, or Firm*—Pennie & Edmonds

[57] ABSTRACT

A spark-ignition internal combustion engine having an intake passageway diverging into first and second intake passage portions leading to combustion chambers of the engine. A blocking valve is movably disposed in the second intake passage portion and be adapted to close in a low engine load operating range while open in a high engine load operating range. The engine is provided with a control unit for controlling operation of the blocking valve and of a spark plug for each combustion chamber. Under the action of the control unit, spark timing of the spark plug is controlled to be advanced in the high engine load operating range relative to that in the low engine load operating range. Additionally, degree of such spark timing advance is reduced during a transition time period from initiation to completion of opening operation of the blocking valve. Degree of such spark timing advance reduction is controlled to vary with time lapse during the transition time period. Such control suppresses phenomena of too early spark timing during the transition time period, thereby preventing engine knock.

18 Claims, 3 Drawing Sheets

SPARK-IGNITION INTERNAL COMBUSTION ENGINE

BACKGROUND OF THE INVENTION

1. Field of the Invention

The present invention relates generally to an improvement in a spark-ignition internal combustion engine, and more particularly to spark timing control technique for such an engine whose intake system function is variably controlled in accordance with engine operating conditions.

2. Description of the Prior Art

In connection with spark-ignition internal combustion engines, to appropriately control combustion efficiency of the engine in accordance with engine loads, it has been proposed that an intake air pipe is branched off at its intermediate section into first and second parallel intake passage portions leading to engine combustion chambers, in which intake air is introduced through both the branch intake passage portions during a high load engine operation requiring much intake air while through only the first branch intake passage during a low load engine operation requiring less intake air.

This deals with drawbacks in which, in case intake air is introduced through a single intake pipe throughout all engine load operating ranges, the flow rate of intake air unavoidably lowers to deteriorate combustion during the low engine load operation upon the cross-sectional area of the single intake pipe being decided greatly taking account of power output characteristics at high engine load. In other words, with the engine provided with the first and second branch intake passage portion, intake air flow resistance decreases to obtain high engine power output during the high engine load operation in which intake air flows through both the first and second intake passage portions, whereas the flow rate of intake air increases to improve combustion during the low engine load operation in which intake air flows through only the first intake passage portion.

In the thus arranged engine in which combustion state in the combustion chamber changes depending upon condition of an intake system, spark timing is changed in accordance with the opened or closed state of the second intake passage portion since optimum spark timing changes depending on combustion state. More specifically, spark timing is set to be advanced during high load engine operation relative to during the low load engine operation, because intake air flow rate decreases to lower combustion speed thereby to lower engine power output during the high engine load operation in which both the first and second intake passage portions are used. In other words, this avoids abnormal combustion such as engine knock by retarding spark timing in accordance with an increase in intake air flow rate during the low load engine operation closing the second intake passage portion, which spark timing retardation is made relative to the high load engine opration.

Opening and closing the above-mentioned second intake passage portion is carried out by a blocking valve movably disposed in the passage portion. The blocking valve is usually operated by a fluid-pressure operated actuator such as a diaphragm actuator. Such an actuator is disadvantageous in a point of being low in operating speed or response, though it is advantageous in points of being low in and high in responsibility. This provides the following problems: Correction of spark timing and opening and closing actions of the blocking valve are carried out in accordance with signal representative of engine load condition such as intake air amount, in which the spark timing is changed onto an advanced side and simultaneously the valve is opened when engine load increases to some extent from a low load level at which the valve is closed. However, although intake air amount and fuel amount increase at this time, a considerable time is required from initiation to completion of opening operation of the blocking valve owing to the above-mentioned low response. Accordingly, during this time, rich air-fuel mixture flows at a high speed into the combustion chamber and additionally spark timing has been already changed onto the advanced side. This tends to raise engine knock.

SUMMARY OF THE INVENTION

A spark-ignition internal combustion engine according to the present invention is provided with an intake system having an intake passageway through which intake air is inducted into combustion chambers of the engine. The intake passageway deverges into first and second intake passage portions leading to the combustion chambers so that intake air can flow simultaneously through the first and second intake passage portions. A blocking valve is movably disposed in the second intake passage portion to block said second intake passage portion. The blocking valve is openable to allow intake air to flow therethrough. The blocking valve is actuated by a fluid-pressure operated actuator in such a manner as to move in a predetermined direction to open when supplied with a predetermined pressure signal. A blocking valve control device is provided to supply the pressure signal to the fluid-pressure operated actuator in a high engine load operating range. A spark timing computing device is provided to compute spark timing of a spark plug disposed in the combustion chamber in accordance with engine operating condition. The spark timing is corrected to retard during a predetermined time period from initiation of opening operation of the blocking valve under the action of a spark timing correcting device. Additionally, an ignition signal generating device is provided to generate ignition signal to cause the spark plug to spark, in accordance with the corrected spark timing.

Accordingly, when engine load increases so that engine operation comes into the high engine load operating range from a low engine load oprating range in which the blocking valve is closing, the blocking valve starts to open. At this time, spark timing is intended to shift onto advancing side corresponding to high engine load operation; however, the spark timing is actually retarded from initiation of opening operation of the blocking valve, taking account of time delay from the initiation to completion of opening operation of the blocking valve under the action of the spark timing correcting device, so that the spark timing reaches the spark timing corresponding to the high engine load operation when the blocking valve is fully opened. Preferably, the spark timing retardation is varied with time lapse during the time period from initiation to completion of opening operation of the blocking valve. Thus, the spark timing during such a transition time from initiation to completion of opening operation of the blocking valve is controlled well corresponding to the opening degree of the blocking valve, which suppresses too early spark timing during such a transition time, thereby avoiding abnormal combustion.

DETAILED DESCRIPTION OF THE INVENTION

Figure 1:
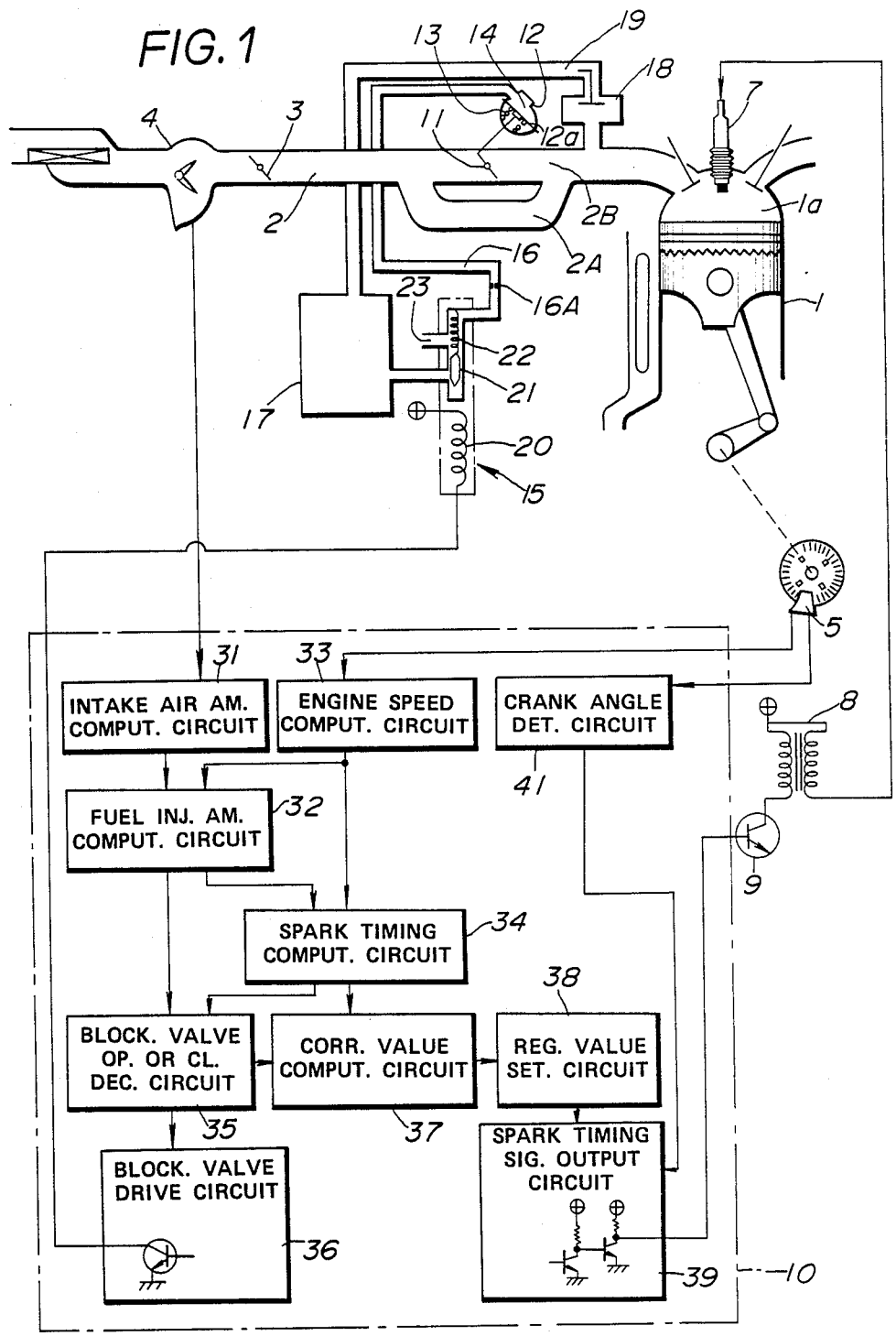
FIG. 1 is a schematic illustration of an embodiment of a spark-ignition internal combustion engine in accordance with the present invention.

Referring now to FIG. 1, there is shown an embodiment of a spark-ignition internal combustion engine in accordance with the present invention. The engine comprised of an engine block 1 formed with combustion chambers 1a each defined by each piston (no numeral) reciprocally movably disposed in an engine cylinder. A spark plug 7 is disposed to project into each combustion chamber 1a. An intake pipe or passageway 2 is provided to establish communication between the combustion chamber 1a and atmospheric air so that the combustion chamber 1a can be supplied with atmospheric air together with fuel. A throttle valve 3 is rotatably disposed in the intake passageway 2 to control the amount of intake air flowing through the intake air passageway 2. An air flow meter 4 is located in the intake passageway upstream of the throttle valve 3 to measure the amount of intake air flowing through the intake passageway 2. A crank angle sensor 5 is provided to detect angular position of a crankshaft (no numeral) of the engine. An ignition coil 8 is electrically interposed between the spark plug 7 and a power transistor 9 for interrupting primary current flow to be supplied to the primary windings of the ignition coil 8. The air flow meter 4, the crank angle sensor 5 and the power transistor 9 are electrically connected to a control circuit 10 constituted by a microcomputer.

The intake passageway 2 is branched off or diverges at its portion downstream of the throttle valve 3 into first and second intake passage portions 2A, 2B through which intake air can be introduced into the combustion chamber 1a. The first intake passage portion 2A is normally opened, while the second intake passage portion 2B is closable by a blocking valve 11 of the butterfly valve type, pivotally mounted in the second intake passage portion 2B. The first and second intake passage portions 2A, 2B join with each other at a portion downstream of the blocking valve 11 and leads to the combustion chamber 1a. The blocking valve 11 is mechanically connected to a diaphragm 12a of a diaphragm actuator 12 which disphragm defines a vacuum chamber 14. The blocking valve 11 is normally biased to its fully open position under the bias of a tension spring 13 pulling the diaphragm 12a, while driven to its fully closed position when vacuum over a predetermined level is supplied to the vacuum chamber 14.

The vacuum chamber 14 of the diaphragm actuator 12 communicates with a vacuum tank 17 via a vacuum supply passage 16 in which a three-way solenoid valve 15 is operatively disposed. An orifice 16A is disposed in the vacuum supply passage 16 near the three-way solenoid valve 15 and between the valve 15 and the vacuum chamber 14 thereby to stabilize the operation of the diaphragm 12a even upon fluctuation of vacuum. The vacuum tank 17 communicates through a vacuum introduction passage 19 with the intake passageway 2 at a portion downstream of the portion at which the first and second intake passage portions 2A, 2B join. A check valve 18 is disposed in the vacuum introduction passage 19. Accordingly, the check valve 18 opens under the pressure differential between the vacuum tank 17 and the intake passageway 2 is a low engine load operating range in which a strong vacuum is generated in the intake passageway 2 downstream of the throttle valve 3 because of a small opening degree of the throttle valve 3, so that intake (manifold) vacuum is introduced into the vacuum tank 17. When the opening degree of the throttle valve 3 increases to reduce the intake (manifold) vacuum prevailing downstream of the throttle valve 3, the check valve 18 closes due to relative pressure drop on the side of the vacuum tank 17. Thus, vacuum is always maintained in the vacuum tank 17.

The three-way solenoid valve 15 fluidly interposed between the vacuum tank 17 and the diaphragm actuator 12 includes a valve member 21 disposed in the vacuum supply passage 16 and movable vertically in FIG. 1 under the action of a tension spring 22 and a solenoid coil 20. When no electric current is passed through the solenoid coil 20, the valve 21 is biased to its position to establish communication between the vacuum tank 17 and the vacuum chamber 14 under the bias of the spring 22, so that the three-way solenoid valve 15 is brought into its fully closed position. When electric current is passed through the solenoid coil 20, the valve member 21 is attracted toward the coil 20 against the bias of the spring 22, so that the communication between the vacuum tank 17 and the vacuum chamber 14 is blocked while allowing the vacuum chamber 14 to communicate with an air inlet opening 23 opened to atmospheric air, thus putting the three-way solenoid valve 15 in its fully opened position.

The control circuit 10 is arranged to control the blocking valve 11 together with spark timing of the spark plug 7 as discussed below. In this embodiment, the control circuit 10 employs a part of another control circuit for an electronically controlled fuel injection system (not shown) mounted on the engine, so that a fuel injector valve or valves are installed to inject fuel into the intake passageway 2 upstream of the combustion chamber 1a though not shown. The control circuit 10 makes a control action in which standard spark timing is decided in accordance with standard fuel injection amount and engine speed, in which the standard fuel injection amount is decided in accordance with signals from the air flow meter 4 and the crank angle sensor 5. This control action is made, for example, at time intervals of 10 ms.

Figure 2:
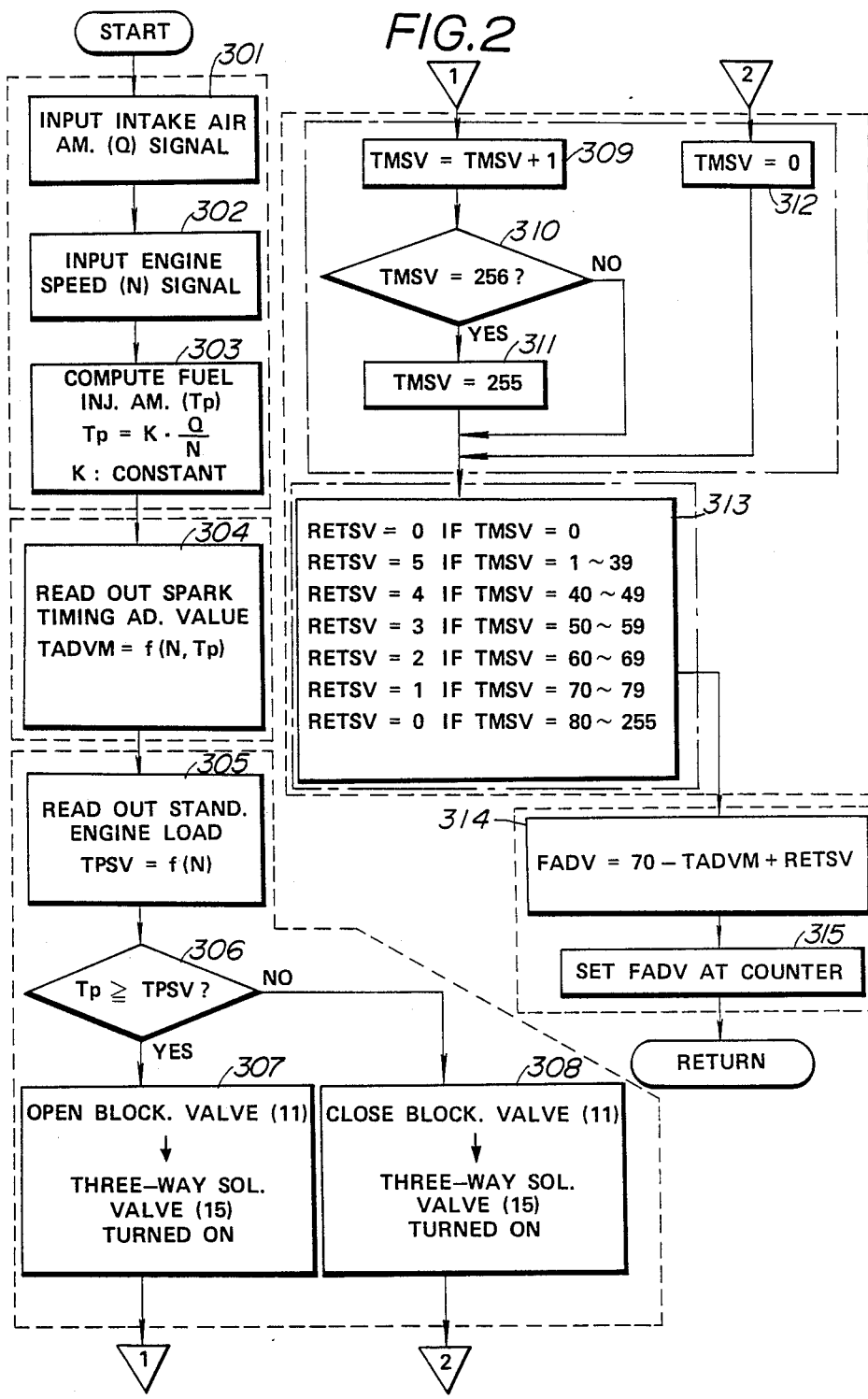
FIG. 2 is a flow chart showing a manner of control operation of a control circuit provided in the engine of FIG. 1.

Such control action of the control circuit 10 will be discussed in detail also with reference to a flow chart of FIG. 2. First, voltage signal representative of intake air amount (flow rate) Q output from the air flow meter 4 is converted into digital signal by an intake air amount computing circuit 31 and output as intake air amount signal (Q) to a fuel injection amount computing circuit 32. The crank angle sensor 5 generates pulse signal representative of standard angular position of the crankshaft at intervals of a standard rotational angle (for example, 180 degrees in case of a 4-cylinder engine), and additionally generates pulse signal representative of unit angular position of the crankshaft at intervals of a unit rotational angle (for example, 1 degree), the pulse signal appearing to repeat its on-and-off action. The unit angular position pulse signal is input to an engine speed computing circuit 33 in which engine speed N is determined by counting the number of the input unit angular position pulse signals per a unit time. The thus obtained engine speed N is input as an engine speed signal N to the fuel injection amount computing circuit 32 (See steps 301 and 302 in the flow chart of FIG. 2).

In the fuel injection computing circuit 32, the standard fuel injection amount Tp corresponding to the calculation formula of $K \cdot Q/N$ (where K is a constant) is obtained by table look-up in accordance the input Q and N (See Step 303). The standard fuel injection amount Tp actually provides a valve opening time ratio of the solenoid-operated fuel injector valve, the fuel injector valve opening for the time ratio to inject fuel. Signal representative of the standard fuel injector amount Tp is output to a fuel injector drive circuit (not shown) after a predetermined correction discussed after is made to the signal, thereby accomplishing control of fuel injection amount or amount of fuel to be injected from the fuel injector.

Then, the signal representative of the standard fuel injection amount Tp from the fuel injection amount computing circuit 32 and the signal representative of the engine speed N from the engine speed computing circuit 33 are input to a spark timing computing circuit 34 which is adapted to calculate the standard spark timing in accordance with Tp and N, in which read-out operation from a table is made which table has been previously set to provide an appropriate spark timing advance value TADVM in accordance with Tp and N. The table is so arranged as to provide different spark timing advance characteristics between low and high engine load sides which are divided by a standard engine load (TPSV) for opening and closing the blocking valve 11, as discussed after. More specifically, in the low engine load operation in which the blocking valve 11 is closed to block the second intake passage 2B, spark timing is so set as to retard relative to in a condition in which the blocking valve is left opened. Accordingly, the degree of spark advance is larger on the high engine load side than on the low engine load side near an engine operation transition point at which the blocking valve 11 makes its opening or closing action.

Figure 3:
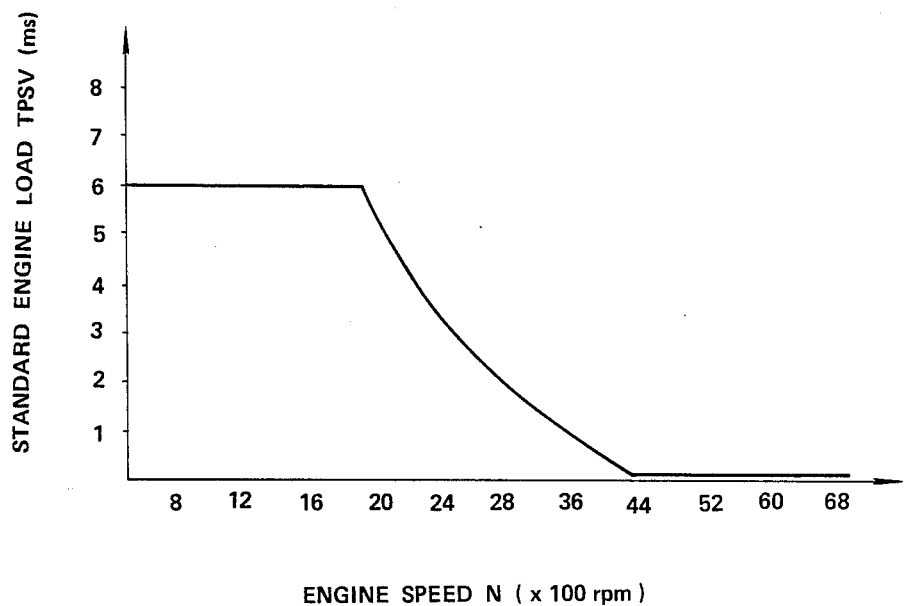
FIG. 3 is a graph showing a relationship between standard engine load (TPSV) and engine speed (N), used in the control opration in the flow chart of FIG. 2.

Next, the standard engine load TPSV is decided in accordance with engine speed N. The standard engine load TPSV is stored as a table, for example, corresponding to the characteristics shown in FIG. 3 and accordingly obtained by read-out operation using the engine speed N as a parameter (See Step 305). The standard engine load TPSV serves as a comparison standard for engine load conditions represented by the standard fuel injection amount Tp, so that the blocking valve 11 is opened upon decision of high engine load operation in case of $Tp \geq TPSV$, while closed upon decision of low engine load operation in case of $Tp < TPSV$ (See Steps 306 to 308). Such decisions of the standard engine load TPSV and the engine load condition are carried out in a blocking valve opening or closing decision circuit 35 to which the signal representative of the standard fuel injection amount Tp from the fuel injection amount computing circuit 32 and the signal representative of the engine speed N through the spark timing computing circuit 34 are input. The resultant decision of the blocking valve opening or closing dicision circuit 35 is input as a low or high level signal to a blocking valve drive circuit 36. In the high engine load operating range, the signal output to the circuit 36 is at a high level, so that the drive circuit 36 allows electric current to pass through the solenoid coil 20 of the three way solenoid valve 15 thereby to operate the blocking valve 11 toward its fully opened position. On the contrary, in the low engine load operating range, the signal is at a low level, so that the drive circuit 36 prevents electric current from passing through the solenoid coil 20 thereby to operate the blocking valve 11 toward its fully closed position.

Furthermore, count of a timer value TMSV is initiated simultaneously with initiation of opening operation of the blocking valve 11. It is to be noted that the timer value TMSV is zero always when the blocking valve makes its closing operation, and therefore the timer value increases by one unit every control cycle up to the maximum level of 256 only when the blocking valve 11 initiates its opening operation (See Steps 309 to 312). Accordingly, the timer value TMSV represents a time lapse from initiation of opening operation of the blocking valve 11. Control of the timer value TMSV is made every cycle of 10 ms, so that the time lapse from the initiation of the blocking valve opening operation is about 1 second, for example, in case of the timer value $TMSV = 100$.

In accordance with this timer value TMSV, a spark timing correction value RETSV for correcting the change of ignition timing toward that for the high load engine opration is decided (See Step 313). The setting of the spark timing correction value RETSV is exemplified in the flow chart of FIG. 2, in which the spark timing correction value RETSV decreases stepwise from 5 to 0 on the estimation that about 0.7 to 0.8 second is required from the initiation to completion (or termination) of opening operation of the blocking valve 11. More specifically, when the timer values TMSV are 0, 1 to 39, 40 to 49, 50 to 59, 60 to 69, 70 to 79, and 80 to 255, the spark timing correction valves RETSV are 0, 5, 4, 3, 2, 1 and 0, respectively. It is to be noted that spark timing correction is unnecessary when the blocking valve 11 initiates its closing operation (TMSV=0), in which the spark timing correction value RETSV is set zero.

The counting of the timer value TMSV and setting of the spark timing correction value RETSV are carried out by a correction value computing circuit 37. The correction value computing circuit 37 is so arranged as to initiate count-up of the timer value TMSV in accordance with signal representative of opening operation of the blocking valve 11 output from the blocking valve opening or closing decision circuit 35, and additionally to set the spark timing correction value RETSV in accordance with the timer value TMSV as discussed above.

The thus set spark timing correction value RETSV is input together with the spark timing advance value TADVM to a register value setting circuit 38. The register value setting circuit 38 is arranged to compute a value $FADV = 70 - TADVM + RETSV$ which represents a crankshaft rotational angle between a standard crank angle (70 degrees before top dead center in this case) and a crank angle corresponding to spark timing. In other words, the spark timing is reached when the crankshaft rotates by the above-mentioned crankshaft rotational angle from the standard crank angle. Signal representative of the value FADV is output to a spark timing signal output circuit 39 (See Steps 314 to 315).

The spark timing signal output circuit 39 includes a register in which the computed value FADV is set, and a counter for measuring the rotational angular amount of the crankshaft. The circuit 39 is arranged to count the rotational angular amount of the crankshaft from the standard crank angle in accordance with signal from a crank angle detecting circuit 41 for treating the signal representative of the standard angular position and the signal representative of the unit angular position both output from he crank angle sensor 5, and to put the power transistor 9 off at a point of time at which the rotational angular amount of the crankshaft is brought into coincident with the value FADV, thereby interrupting primary current to the ignition coil 8. This allows to high voltage secondary current to be supplied to the spark plug 7.

Since the value FADV represents the rotational angular amount of the crankshaft from the position of 70 degrees before top dead center to the position corresponding to the spark timing, spark timing is retarded as the value FADV increases. Accordingly, addition of the spark timing correction value RETSV corrects the spark timing to shift to the retarded side, which suppresses phenomena of excessively early spark timing during a transistion condition from initiation to completion of opening operation of the blocking valve 11, thereby effectively preventing engine knock.

It will be understood that, according to the above-discussed embodiment, the delayed amount of spark timing is controlled to vary in accordance with a change in opening degree of the blocking valve 11, thereby not only effectively preventing engine knock but also providing suitable combustion characteristics in the transition condition of the blocking valve opening operation.

What is claimed is:

1. A spark-ignition internal combustion engine comprising:
    means defining an intake passageway communicated with combustion chamber of the engine, said intake passageway diverging into first and second intake passage portions leading to the combustion chamber;
    a blocking valve movably disposed in said second intake passage portion to block said second intake passage portion, said blocking valve being openable;
    a pressure-operated actuator for actuating said blocking valve to move in a first direction to open said blocking valve upon being supplied with a first pressure signal;
    means for computing spark timing of a spark plug disposed in the combustion chamber, in accordance with engine operating conditions, said spark timing taking a first spark timing characteristic in said high engine load operating range and a second spark timing characteristic in a low engine load operating range, said first spark timing characteristic advanced relative to said second spark timing characteristic;
    means for correcting said spark timing to retard said first spark timing characteristic during a predetermined time period from initiation of opening operation of said blocking valve; and
    means for generating an ignition signal to cause the spark plug to spark, in accordance with the spark timing corrected by said spark timing correcting means.

2. A spark-ignition internal combustion engine as claimed in claim 1, wherein said spark timing correcting means includes means for correcting said spark timing to retard during a time period from the initiation to completion of opening opration of said blocking valve.

3. A spark-ignition internal combustion engine as claimed in claim 1, wherein said spark timing correcting means includes means for correcting said spark timing to retard relative to a spark timing in a state in which said blocking valve is in its fully opened position under a constant engine load condition.

4. A spark-ignition internal combustion engine as claimed in claim 1, wherein said spark timing computing means includes means for computing spark timing advance value representative of degree of spark advance, wherein said spark timing correcting means includes means for reducing degree of spark advance during said predetermined time period.

5. A spark-ignition internal combustion engine as claimed in claim 1, wherein said spark timing correcting means includes means for gradually reducing degree of spark timing retardation with time lapse from the initiation of said blocking valve opening operation.

6. A spark-ignition internal combustion engine as claimed in claim 4, wherein said spark advance degree reducing means includes means for gradually increasing said spark advance degree with time lapse from the initiation of said blocking valve opening operation.

7. A spark-ignition internal combustion engine as claimed in claim 1, wherein said first and second intake passage portions are located downstream of a throttle valve for controlling amount of intake air to be supplied to the combustion chamber.

8. A spark-ignition internal combustion engine as claimed in claim 1, wherein said blocking valve is of butterfly valve type.

9. A spark-ignition internal combustion engine as claimed in claim 1, wherein said blocking valve selectively takes a fully closed position and a fully opened position.

10. A spark-ignition internal combustion engine as claimed in claim 9, wherein said pressure-operated actuator is constructed and arranged to move said blocking valve in said first direction to reach said fully opened position, and in a second direction to reach said fully closed position upon being supplied with a second pressure signal.

11. A spark-ignition internal combustion engine as claimed in claim 10, wherein said pressure signal supplying means includes means for supplying said second pressure signal to said pressure-operated actuator in a low engine load operating range.

12. A spark-ignition internal combustion engine as claimed in claim 11, wherein said pressure-operated actuator includes a diaphragm mechanically and drivingly connected with said blocking valve, said diaphragm being movable in response to pressure variation applied thereto, said diaphragm being selectively subjected to atmospheric pressure as the first pressure signal in the high engine load operating range and to intake vacuum of the engine in the low engine load operating range.

13. A spark-ignition internal combustion engine as claimed in claim 12, wherein said spark timing computing means includes means for computing spark timing advance value representative of degree of spark advance in accordance with engine load and engine speed of the engine.

14. A spark-ignition internal combustion engine as claimed in claim 13, wherein said engine load is represented by amount of fuel to be supplied to the combustion chamber through a fuel injector valve.

15. A spark-ignition internal combustion engine as claimed in claim 14, wherein said fuel amount is represented by a time during which said injector valve opens to inject fuel.

16. A spark-ignition internal combustion engine as claimed in claim 15, wherein said pressure signal supplying means includes means for comparing said time with a standard value decided in accordance with the engine speed, and to generate first and second signals when said time is larger or smaller than said standard value, respectively, and a three-way solenoid valve taking a first position to allow said actuator diaphragm to be exposed to atmospheric air upon receiving said first signal from said time comparing means, and a second position to allow said actuator diaphragm to be exposed to intake vacuum of the engine.

17. A spark-ignition internal combustion engine as claimed in claim 1, wherein said first and second intake passage portions join with each other at a part downstream of said blocking valve and lead to the combustion chamber.

18. A spark-ignition internal combustion engine comprising:
means defining an intake passageway communicated with combustion chamber of the engine, said intake passageway diverging into first and second intake passage portions leading to the combustion chamber;
a blocking valve movably disposed in said second intake passage portion to block said second intake passage portion, said blocking valve being openable;
a pressure-operated actuator for actuating said blocking valve to move in a first direction to open said blocking valve upon being supplied with a first pressure signal;
means for computing spark timing of a spark plug disposed in the combustion chamber, in accordance with engine operating condition, said spark timing taking a first spark timing characteristic in said high engine load operating range and a second spark timing characteristic in a low engine load operating range, said first spark timing characteristic advanced relative to said second spark timing characteristic;
means for correcting said spark timing to retard said first spark timing characteristic so as to obtain a corrected spark timing characteristic during a predetermined time period from initiation of opening operation of said blocking valve, said corrected spark timing characteristic advancing relative to the second spark timing characteristic; and
means for generating an ignition signal to cause the spark plug to spark, in accordance with said corrected spark timing characteristic.

* * * * *